United States Patent [19]

Knight, Jr.

[11] Patent Number: 4,825,360

[45] Date of Patent: Apr. 25, 1989

[54] SYSTEM AND METHOD FOR PARALLEL PROCESSING WITH MOSTLY FUNCTIONAL LANGUAGES

[75] Inventor: Thomas F. Knight, Jr., Belmont, Mass.

[73] Assignee: Symbolics, Inc., Concord, Mass.

[21] Appl. No.: 893,072

[22] Filed: Jul. 30, 1986

[51] Int. Cl.[4] ............................................. G06F 15/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,466,061 | 8/1984 | De Santis et al. | 364/200 |
| 4,468,736 | 8/1984 | De Santis et al. | 364/200 |
| 4,484,272 | 11/1984 | Green | 364/200 |
| 4,564,901 | 1/1986 | Tomlinson et al. | 364/200 |
| 4,594,655 | 6/1986 | Hoa et al. | 364/200 |

OTHER PUBLICATIONS

Henderson, Peter, "Is it Reasonable to Implement a Complete Programming System in a Purely Functional Style?", *Technical Memo* PMM/94, The University of Newcastle upon Tyne Computing Laboratory, Dec. 1980.

Backus, John, "Can Programming be Liberated from the von Neumann Style?, *A Functional Style and its Algebra of Programs*," Communications of the ACM, vol. 21, No. 8, Aug. 1978, pp. 613–641.

Halstead, Jr., Robert, "Multilisp: A Language for Concurrent Symbolic Computation," *ACM Transactions on Programming* Languages and Systems.

Diel, H., et al., "An Experimental Computer Architecture Supporting Expert Systems and Logic Programming," *IBM J. Res. Develop.*, vol. 30, No. 1, Jan. 1986, pp. 102–111.

*Primary Examiner*—Gareth D. Shaw
*Assistant Examiner*—Jonathan C. Fairbanks
*Attorney, Agent, or Firm*—Sprung, Horn, Kramer & Woods

[57] ABSTRACT

A parallel processing system is receptive of a program and has at least two processors connected in parallel to a shared main memory. Each processor executes instructions of the program which includes side-effecting instructions which modify the contents of a location in main memory and functional instructions which reference locations in main memory. The program is compiled into a series of independent instruction blocks each of which includes predominantly functional instructions and terminates in a side-effecting instruction and the processors execute the blocks in parallel.

13 Claims, 4 Drawing Sheets

```
LOAD R0, C  ⎫
LOAD R1, B  ⎪
ADD R0, R1, R1  ⎬  MOSTLY FUNCTIONAL PORTION
MUL R0, R1, R1  ⎭

STORE R1, A      SIDE EFFECTING INSTRUCTION
```

FIG. 2

```
                    LOAD R0, C     ⎫
                    LOAD R1, B     ⎪
BLOCK POINTER       ADD R0, R1, R1 ⎬  BLOCK 1
                    MUL R0, R1, R1 ⎪  EXECUTING ON PROCESSOR 1c
                    STORE R1, A    ⎭

LOAD R0, C     ⎫
                    LOAD R1, B     ⎪  BLOCK 2
                    ROT R1, R0     ⎬  EXECUTING ON PROCESSOR 1b
                    STORE R1, D    ⎭

LOAD R0, A     ⎫
                    LOAD R1, B     ⎪  BLOCK 3
                    ADD R0, R1, R1 ⎬  EXECUTING ON PROCESSOR 1c
                    STORE R1, A    ⎭
```

FIG. 3

SYSTEM AND METHOD FOR PARALLEL PROCESSING WITH MOSTLY FUNCTIONAL LANGUAGES

BACKGROUND OF THE INVENTION

The present invention relates to a computer system and a method for parallel processing program instructions.

Many parallel architectures start by defining the programming model they support as strictly functional. Computer architects find that the strictly functional approach makes their task easier, because the order in which computation is performed, once the basic dependencies are satisfied, is irrelevant. Building highly parallel machines which execute strictly functional languages then becomes relatively straightforward. Strictly functional languages certainly have advantages, including the relative ease of proving their correctness and the ease of thinking and reasoning about certain simple kinds of programs, as is disclosed in Backus, "Can Programming be Liberated from the von Neumann Style? A Functional Style and its Algebra of Programs" Communications of the ACM Vol. 21 no. 8 pp. 613–641 (August 1978).

Unfortunately, there is a class of algorithms for which the strictly functional programming style appears to be inadequate. The problems are rooted in the difficulty in interfacing a strictly functional program to a non-functional outside environment. It is impossible to program a task such as an operating system, for instance, in the unmodified strictly functional style. Clever modifications of the strict functional style have been proposed which cure this defect. For example, McCarthy's AMB operator, which returns whichever of two inputs are ready first, appears to be adequate to solve this and similar problems. Several equivalent operators have been proposed in Peter Henderson, "Is It Reasonable to Implement a Complete Programming System in a Purely Functional Style?" Technical memo PMM/94, The University of Newcastle upon Tyne Computing Laboratory (December 1980).

However, the introduction of such non-functional operators into the programming language destroys many of its advantages. Architects can no longer ignore the order of execution of functions. Proving program correctness again becomes a very much more difficult task. Users also find the programming with such operators is tedious and error prone. In particular, as shown by Agha in "Actors: A Model of Concurrent Computation in Distributed Systems" M.I.T. Artificial Intelligence Laboratory Technical Memo 844, (1985), the presence of such an operator allows the definition of a new data type, the cell, which can be side effected in just as normal memory locations in non-functional languages. Thus the introduction of the AMB operator, while adequate to solve the lack of side effect problem, re-introduces many of the problems which the functional language advocates are attempting to avoid.

Therefore conventional thought indicated the choice of either defining weak systems, such as purely functional languages, about which one can prove theorems, or defining strong systems which one can prove little about.

Much more serious than any of the theoretical difficulties of strictly functional languages, is the difficulty programmers face in implementing certain types of programs. It is often more natural to think about an algorithm in terms of the internal state of a set of objects as, for example, discussed in chapter 3 of Abelson and Sussman, Structure and Interpretation of Computer Programs, M.I.T. Press, Cambridge, (1985). This object oriented viewpoint in programming language design is incompatible with the strictly functional approach to computation. The same algorithms can be implemented in either style, and both systems are surely universal—but the fact that programmers find one representation for programs easier to think about, easier to design, and easier to debug is, in itself, a powerful motivation for a programming language to provide that representation.

If this were merely a representation issue, there would be hope that suitable compiler technology could eventually lead to a programming language which provides support for side effects, but which compiles into purely functional operations. As has been discussed above, however, in the general case this is not possible.

Side effects cause problems. Architects find it difficult to build parallel architectures for supporting them. Verification software finds such programs difficult to reason about. And programming styles, with an abundance of side effects, are difficult to understand, modify and maintain.

In accordance with the present invention, instead of completely eliminating side effects, it is proposed that their use be severely curtailed. Most side effects in conventional programming languages like Fortran are gratuitous. They are not solving difficult multi-tasking communications problems. Nor are they improving the large scale modularity or clarity of the program. Instead, they are used for trivial purposes such as updating a loop index variable.

Elimination of these unnecessary side effects can make code more readable, more maintainable, and as set forth hereinafter in accordance with the invention, faster to execute.

Many of these same issues motivate Halstead's Multi-Lisp, a parallel variant of Scheme as disclosed in "MultiLisp: A Language for Concurrent Symbolic Computation" ACM Transactions on Programming Languages and Systems, (1985). The approach Multi-Lisp takes to providing access to parallel computation is the addition of programmer visible primitives to the language. The three primitives which distinguish it from conventional Lisp are:

The future primitive which allows an encapsulated value to be evaluated, while simultaneously returning to its caller a promise for that value. The caller can continue to compute with this returned object, incorporating it into data structures, and passing it to other functions. Only when the value is examined is it necessary for the parallel computation of its value to complete;

the pcall primitive which allows the parallel evaluation of arguments to a function. Halstead teaches that pcall can be implemented as a simple macro which expands into a sequence of futures. It can be thought of as syntactic sugar for a stylized use of futures; and the delay primitive which allows a programmer to specify that a particular computation be delayed until the result is needed. Similar in some respects to a future, delay returns a promise to compute the value, but does not begin computation of a value until the result is needed. Thus the delay primitive is not a source of parallelism in the language. It is a way of providing lazy evaluation semantics to the programmer.

Both delay and future result in an order of execution different from applicative order computation. In the absence of side effects, both will result in the same value as the equivalent program without the primitives, since they affect only the order in which the computation is performed. This is not strictly true for delay since its careful use can allow otherwise non-terminating programs to return a value.

In the presence of side effects, it is difficult to predict the behavior of a future, since its value may be computed in parallel with other computations.

While the value of a delay is deterministic, since it does not introduce additional parallelism, its time of computation is dependent on when its value is first examined. This can be very non-intuitive and difficult to think about while writing programs.

Halstead implements the future and delay primitives by returning the caller an object of data-type future. This object contains a pointer to a slot, which will eventually contain the value returned by the promised computation. The future may be stored in data structures and passed as a value. Computations which attempt to reference the value of the future prior to its computation are suspended. When the promised computation completes, the returned value is stored in the specified slot, and the future becomes determined. This allows any pending suspended procedures waiting for this value to run, and any further references to the future will simply return the now computed value.

The use of future or delay can be thought of as a declaration. Their use declares that either the computation done within the scope of the delay or future has no side effects, or that, if it does, the order in which those side effects are done relative to other computations is irrelevant. There is also a guarantee with such a declaration that no free or shared variable referenced by the computation is side effected by some other parallel-executing portion of the program.

Like all declarations, the use of future or delay is a very strong assertion. In a way similar to type declarations, their use is difficult to check automatically, is error prone, has a significant performance impact if omitted, and may function correctly for many test cases, but fail unexpectedly on others.

Advocates of strong type checking in compiled languages have attempted for years to build compilers capable of proving the type correctness of programs. It is believed that they have failed. All languages sophisticated enough for serious programming require at least some dynamic checks for type safety at execution time. These checks are implemented as additional instructions on conventional architectures, or as part of the normal instruction execution sequence on more recent architectures as discussed in Moon, "The Architecture of the Symbolics 3600" The 12th Annual International Symposium on Computer Archecture pp. 76–83 (1985). One alternative, declaring the types of relying on the word of the programmer, while leading to good performance on conventional architectures, is dangerous, error-prone, and inappropriate for sophisticated modern programming environments.

SUMMARY OF THE INVENTION

The main object of the present invention is to eliminate the disadvantages of the prior art systems.

The present invention relates to a computer system having the ability to execute several portions of a program in parallel, while giving the appearance to the programmer that the program is being executed sequentially. This automatic extraction of parallelism makes the architecture attractive because one can exploit the existing programming tools, languages and algorithms which have been developed over the past several decades of computer science research, while gradually endeavoring to improve them for the parallel environment. While not all of the benefits of parallel execution will be attained with this architecture, the ability to extract even modest amounts of parallel execution from existing programs may be worth the effort. Moreover, the architecture can be extended, to provide some explicit and modular programmer control over the parallelism.

In achieving the invention, just as hardware has provided important runtime support for type checking, it is proposed to use hardware in the runtime checking for future declarations.

In a proposed Lisp implementation, explicit language extensions such as future and pcall are not used. Instead, it is assumed that each evaluation is encapsulated in a future and that each call can freely evaluate its arguments in parallel. The approach is to detect and correct those cases in which this assumption is unjustified.

In accordance with the invention a compiler transforms the program into sequences of compiled primitive instructions, called transaction blocks. Each transaction block has a mostly functional portion and terminates in a side effect. While the mostly functional portion preferably has no side effecting instructions, the system will operate effectively as long as at least the majority of the instructions are functional, that is only reference but do not modify main memory.

Each block is independent of previous execution, except for the contents of main memory. In particular, no registers or other internal bits in the processor are shared across blocks.

Each block contains exactly one side-effecting store into main memory, occurring at the end of the block.

Each transaction block is, from the standpoint of the memory system, a mostly functional program consisting of register loads and register-to-register instructions, intermediate side effecting stores and ending with side effecting store into main memory. The results of the side effecting stores are temporarily stored, before being applied to main memory.

Each of these blocks can be executed independently, on several different processors. Moreover, there is no interaction between blocks until the blocks are confirmed, that is the results are validated. However, the order in which the blocks are confirmed is critical. The side effects must be executed in a well defined order: the order specified in the program. Further, the execution of side effect can potentially modify a location which some other block has already read.

These two tasks—confirming in order, and enforcing the dependencies of later blocks on earlier side effects—require special hardware in accordance with the invention.

Each processor is free to execute its block at will. The results of the side effects are stored in a cache associated with the processor. As a result, this execution cannot affect other processors. A block counter is maintained, similar in purpose to a normal program counter. The block counter's job is to keep track of which block is next allowed to be confirmed. As the block counter reaches each block in turn, the block compares its referenced locations with modified location of already confirmed blocks. If there is no comparison, this block is confirmed. Confirming a block allows the results stored in the cache to be sent to main memory and modify the contents of main memory. Other blocks, not yet confirmed, may already have referenced the location which has just been modified. If they have, then the data upon which they are computing is now invalid when they are confirmed.

But the program which they are executing has not modified main memory since the results are stored in a cache. Thus the system is free to abandon the unconfirmed executed block, and to attempt re-executing it a second time. This abandoning of an unconfirmed executed block is called aborting the block.

In order to detect when the block needs to be aborted, one needs to keep track of which memory locations it has referenced. A dependency list is therefore maintained, containing the addresses of all locations in main memory which have been referenced during execution of a block. When a processor executes a load instruction, it adds the address being loaded to the executing block's dependency list.

When a block is confirmed, the address it is side effecting is broadcast to all other executing processors. Each processor checks its dependency list to determine if the block it is executing has referenced the modified location. If it has, the block is aborted and re-executed.

Eventually, a given block will be reached by the block counter, and it will be allowed to complete and perform its side-effect. The block counter advances to the next block, and if the block is ready, that block is confirmed in the following cycle. If the confirmation of one block aborts the execution of successor blocks, however, the performance will be limited by the time it takes the aborted block to re-execute its program.

The performance improvement resulting from this technique depends on two factors: the average block length, and the frequency of aborts. The longer the block, the fewer confirms are necessary to execute a given program. The more frequent the aborts, the more the block counter must await a sequential computation before confirming the next block.

One can see now the influence of reducing the number of side effects in the source program: as the number of side effects is reduced, the length of the blocks can be increased. Since the blocks are longer, fewer blocks need be executed to perform a computation. Since the block execution is sequential, at a rate limited to a maximum of one per clock cycle, this limits the performance of the architecture. There is probably a maximum desirable block length, since as the block size increases, the length of the dependency list, and thus the likelihood of a side effect from another block influencing the computation goes up.

In accordance with the invention, the parallel processing system of the invention is receptive of a program and has at least two processors connected in parallel to a shared main memory. Each processor executes instructions of the program which includes side effecting instructions which modify the contents of a location in main memory and functional instructions which reference locations in main memory. Means are provided for compiling a program into a series of independent instruction blocks including predominantly functional instructions and terminating in a side-effecting instruction and wherein the processors execute the blocks in parallel.

The system accordingly further comprises for each processor, means for maintaining a dependency list of all locations in main memory which have been referenced during the execution of a block therein, first cache means associated with each processor for temporarily storing the location and contents of each location in main memory to be side effected by the execution of the block in the associated processor and means are provided for confirming each block in the order of the blocks as specified in the program wherein the validity of the contents of the first cache means are approved. The confirming means comprise means for comparing the dependency list of the block to be confirmed with the locations side effected by already confirmed blocks to detect a match and means for aborting the execution of the block to be confirmed if there is a match.

In a preferred embodiment, the confirming means comprises a block counter and means for incrementing the block counter to indicate the next block to be confirmed. The means for maintaining the dependency list comprises second cache means associated with each processor for temporarily storing each location and contents of main memory referenced by a block being executed in the processor. The confirming means further comprises means for updating the contents of the second cache means upon the aborting of a block and for effecting the reexecution of an aborted block with the side effected location from an already confirmed block.

In one embodiment the first and second cache means each comprises a fully associative content addressable memory. In the alternative embodiment, the second cache means comprises an addressable random access memory for storing the dependency information of main memory locations and hash table means receptive of said addresses of the main memory locations for hashing them into a reduced member of address bits for addressing the random access memory.

In accordance with the present invention, the method for executing a program in at least two processors connected in parallel to a shared main memory, comprises compiling the program into a series of independent instruction blocks including predominantly functional instructions and terminating in a side-effecting instruction, applying the blocks to the processors and executing the blocks in parallel.

The step of executing comprises maintaining a dependency list for each processor of all locations in main memory which have been referenced during the execution of a block therein, for each processor temporarily storing the location and contents of each location in main memory to be side effected by the execution of the block therein and confirming each block in the order of the blocks as specified in the program to approve the validity of the temporarily stored contents by comparing the dependency list of the block to be confirmed with the locations which have been side effected by the already confirmed blocks to detect a match.

When there is a match the execution of the block is aborted.

The step of maintaining a dependency list preferably comprises temporarily storing, for each processor, each location and contents of main memory referenced by the block being executed therein and wherein the step of executing further comprises reexecuting an aborted block with the side effected location from an already confirmed block.

In another embodiment, the step of temporarily storing the referenced locations comprises hashing each location address into a hashed address having a reduced number of address bits and storing a logic one at the hashed address in a random access memory.

Moreover, the method includes selectively omitting referenced locations from the dependency list when desired.

These and other features of the invention will be described in the following description with reference to the drawings, wherein:

BRIEF DESCRIPTION OF THE DRAWINGS

FIG. 2 shows an example of a transaction block according to the invention;

FIG. 3 shows an example of several blocks executing in parallel;

DETAILED DESCRIPTION OF THE INVENTION

Figure 1:
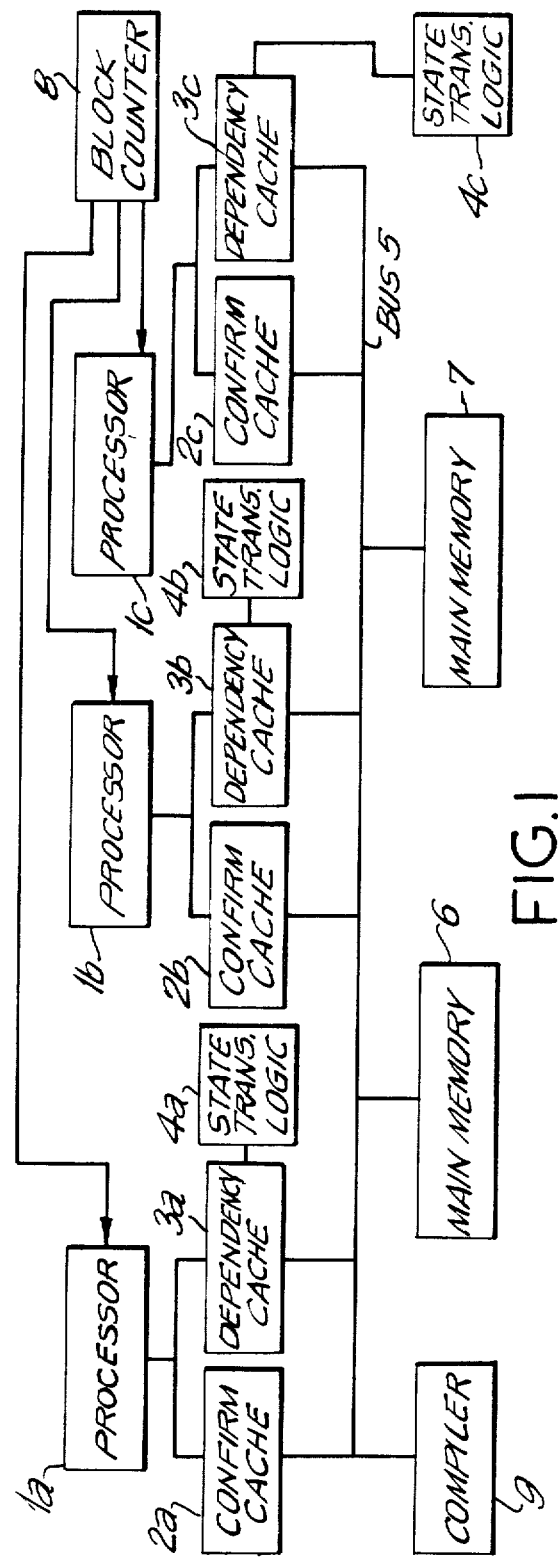
FIG. 1 is a block diagram of a system according to the invention.

Referring now to FIG. 1, the system in accordance with the present invention includes processors 1a, 1b, 1c connected in parallel to common bus 5 to share main memories 6 and 7. It should be noted that while three processors are shown in parallel for the purpose of example, the system according to the present invention can utilize at least two processors in parallel up to an indefinite number in accordance with the method and system of the present invention. It should also be noted that the present invention is also capable of operating in a quasi parallel processor of the type wherein a single processor which executes two or more programs in an interleaved manner is also contemplated as being within the scope of the present invention.

Connected between each processor and the bus 5 are a confirm cache 2a, 2b, 2c and a dependency cache 3a, 3b, 3c which has associated state transition logic 4a, 4b, 4c connected thereto. Processors 1a, 1b and 1c also have connections to a block counter 8, which will be described hereinafter.

The system also includes compiler 9 connected to the bus in a conventional manner for transforming an input program into sequences of compiled primitive instructions called transaction or instruction blocks.

Each block, as shown in FIG. 2, has a mostly functional portion and terminates in a side effecting store instruction. As noted, the functional instructions include those which reference main memory to carry out the operations thereof or operate only on internal processor registers, while the side effecting instructions are those which require modification of the contents of a location in main memory.

The mostly functional portion can have no side effecting instructions or one or more side effecting instructions, as long as at least a majority of the instructions thereof are functional.

In accordance with the method of the present invention, after the compiler 9 has broken up the program into the blocks, the blocks are applied to the processors 1a-1c for execution in parallel. Each reference to main memory is stored in the dependency cache 3a-3c whereas each side effecting instruction is carried out and written only into the confirm cache 2a-2c.

Thus each processor is free to execute its block at will since all referenced locations and all locations to be modified are stored in the caches 2a-2c and 3a-3c without the contents of main memory 6, 7 being affected.

In order to validate the data for being written into main memory to modify the contents thereof, each block must first be confirmed. The blocks are confirmed in the order specified in the overall program and this is carried out by the block counter 8 which specifies the order in which the processors 1a-1c will be confirmed.

The dependency caches 3a-3c, by keeping track of all memory locations referenced by the processor during the execution of a block, thereby maintains a dependency list of the data which is depended on by the block in order to achieve the execution thereof. After the first block is confirmed, all of the side effected locations stored in the confirmed cache corresponding thereto is placed out on the bus and received by the dependency caches of the other blocks to see if any of these side effected locations were depended upon by the blocks during execution. If this is the case and there is a match, then the executed unconfirmed block must be aborted and reexecuted with the updated side effected location data.

In a preferred embodiment of the present invention, the confirm and dependency caches are fully associative content addressable memories which enable the comparison to be made without any additional structure.

FIG. 3 shows an example of several blocks executing in parallel. As can be seen from this example, block 3 will abort when the first block is confirmed since block 3 references the variable A which has been side effected in block 1.

Since the system is simulating the behavior of a uniprocessor by using parallel hardware, there is a defined order in which the blocks must be confirmed. Execution of a given block should start early enough so that its results are ready by the time that block is reached by the block counter 8.

Figure 4:
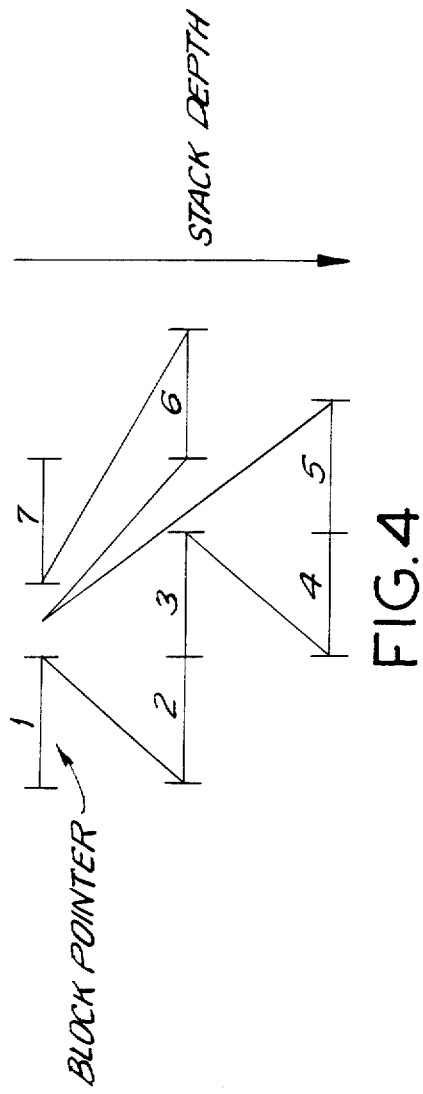
FIG. 4 is a call tree for guiding the block starting process according to the invention.

FIG. 4 shows a call tree of a process which provides heuristic data to guide the block starting process. Here, it is desirable to start execution of blocks 2 and 3, while the block counter is at block 1, because these are the next sequential blocks. One would also want to start execution of block 6, because it is unlikely that confirming blocks 1-5 will side effect data which block 6 depends upon.

But starting execution of a block earlier is potentially bad, because it will reference data which is older than necessary and because the processor being used to execute it may be needed to execute a block which must be confirmed sooner.

These observations lead to the following block execution strategy:

1. Start executing blocks ahead of this block, or downward and to the left in the call tree.
2. Start executing blocks which branch downward to the right in the call tree.
3. If additional processors are required for (1) or
(2), abort execution of the furthest right branches of the call tree, and reclaim their processors.

Heuristic (1) is very similar to instruction pre-fetching on conventional pipelined architectures. Since we are executing this block, we will next need to execute its successor.

Heuristic (2) depends on the fact that parallel execution of evaluations from the same level of the call tree are often independent, and can often be executed without conflicting side effects.

Heuristic (3) is a simple consequence of the fact that we must finish execution of the bottom left portion of the call tree prior to executing the right portion of the call tree. Thus, we are better off using the processors executing blocks to the right for more immediate needs.

These heuristics give a very good handle on the difficult problem of resource allocation in the multiprocessor environment.

The presence of conditionals in the language, however, makes the tidy resource allocation scheme described above much more difficult. Since one does not know which of the two paths a conditional will follow until the data computation is confirmed, one must start blocks executing down both branches, or risk delaying execution waiting for a block on the path not followed. Fortunately, one is free to start executing down both paths, since until a block is confirmed it does not side effect main memory. The blocks started along the unfollowed branch of a conditional are simply aborted without confirming.

Allocation of processor resourses in the presence of conditionals is substantially more difficult, since one cannot, except heuristically, predict which of two paths is more worthwhile for expending processsor resources.

Loops are a special case of conditional execution. As with most parallel processors, there is an advantage in knowing the high level semantics of a loop construct. Rather than attempting to execute repetitive copies of the same block, incrementing the loop index as a setup for the next pass, it is far preferably to know that a loop is required, and that the loop is, for example, indexing over a set of array values from 0 to 100. One can then execute 101 copies of the loop block, each with a unique value of the loop index. The unpalatable alternative is to rely on the side effect detection hardware to notice that the loop index is changed in each block iteration, resulting in an abort of the next block on every loop iteration.

Unlike most of the parallel proposals for loop execution, however, the systems herein can also handle the hard case where the execution of the lop body modifies the loop control parameters, perhaps in a very indirect or conditional way.

The way the system deals with both conditional execution and with loop iteration involves prediction of the future value of a variable. In a sense, the dependency list maintenance already described is a form of value prediction: one predicts that the value one is depending upon will not change by the time the executing block confirms.

One can extend this idea to one which predicts the future value of variables likely to be modified from their current value prior to executing the block. One application of this technique is to the problem of loop iterations. Instead of relying on the current value of the loop index as the predicted value for the next iteration, one desires to predict the future value—predicting a different future value for each parallel body block started.

Similarly, one can implement conditionals by predicting the value of the predicted result slot predicting that it is true in one arm of the conditional, and that it is false in the other. The predicate is then evaluated, and when it confirms, it side effects the predicate result slot, aborting one of the two branches. When aborting the execution of conditional blocks, we must abandon execution of the block rather than update the variable and retry, as we would in normal block execution.

The shared memory multiprocessor of the present invention, with each processor $1a$-$1c$ containing two fully associative caches effectively implements the above scheme. The first of the caches, the dependency cache $3a$-$3c$, usually holds read data copies from main memory 6,7. This cache also watches bus transactions in a way similar to the snoopy cache coherency protocol as described in Goodman, "Using Cache Memory to Reduce Processor Memory Traffic" The 10th Annual International Symposium on Computer Architecture pp. 123-131 (1983). The second cache, the confirm cache $2a$,$2c$, holds only side effected data written by the associated processor, but not yet confirmed.

Since the processors share a common memory bus 5, each cache can see all writes to main memory. The dependency cache acts as a normal data read cache, but also implements the dependency list and predicted value features. The confirm cache is used to allow processors to locally side effect their version of main memory, without those changes being visible to other processors prior to their block confirmation.

Each main memory location, therefore, can have two entries in a processor's caches, one in the dependency cache, and one in the confirm cache. This is because a knowledge must be maintained of what data the processor's current computation has depended upon, in the dependency cache, while also allowing the processor to tentatively update its version of memory, in the confirm cache. For processor reads, priority is always given to the contents of the confirm cache if there is an entry in both caches, because one wants the processor to see its own modifications to memory, prior to them being confirmed.

The dependency cache performs three functions:
1. It acts as a normal read data cache for main memory data.
2. It stores block dependency information.
3. It holds predicted values of variables associated with this block.

Figure 5:
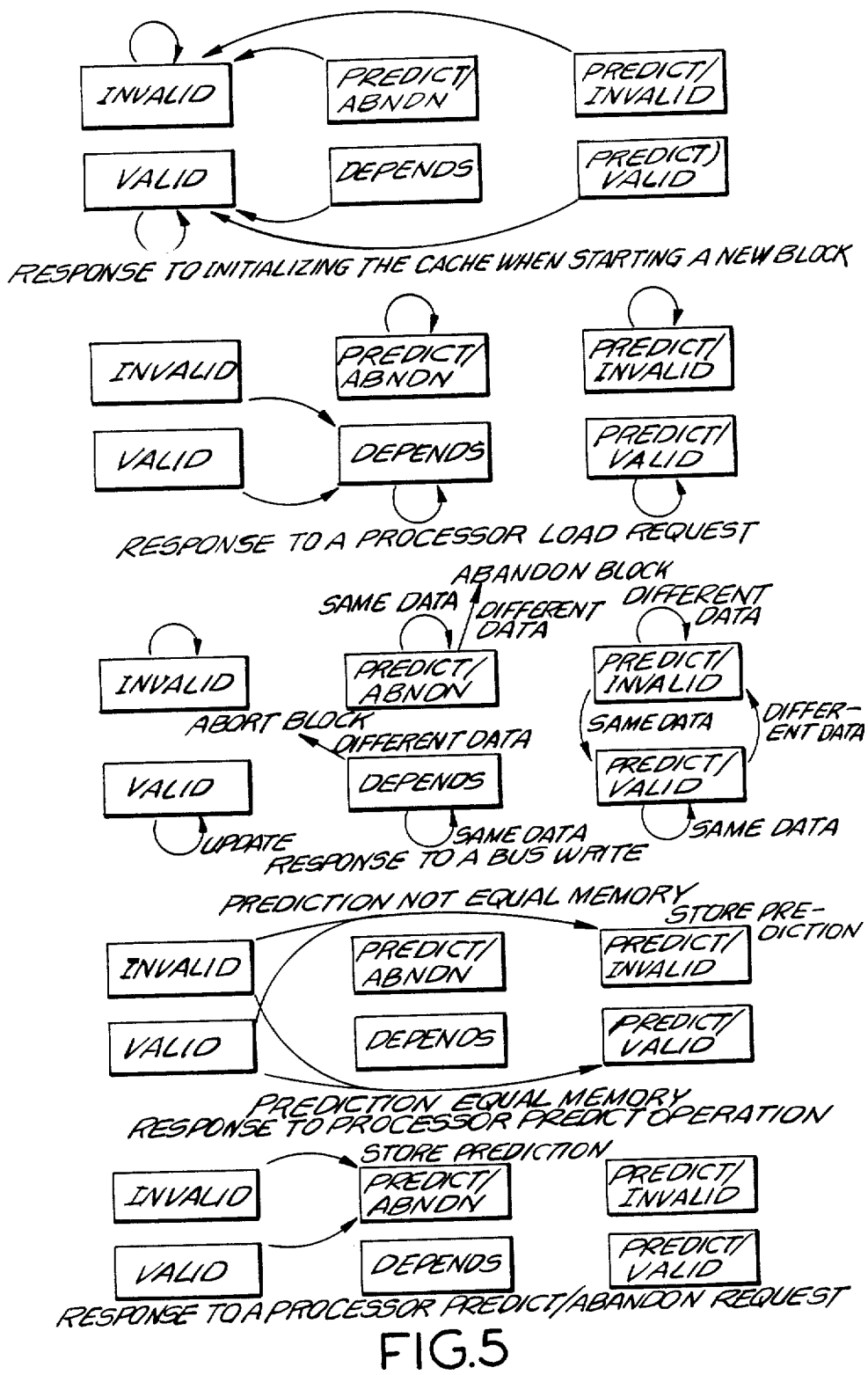
FIG. 5 is a state transition diagram of the state transition logic for the dependency cache.

FIG. 5 shows a state transition diagram for the dependency cache as carried out by the state transition logic $4a$, $4b$, $4c$. There are six states shown in the cache state diagram: INVALID, VALID, DEPENDS, PREDICT/VALID, PREDICT/INVALID and PREDICT/ABANDON.

INVALID is the state associated with an empty cache line.

VALID is the state representing that the cache holds a correct copy of a main memory date.

DEPENDS indicates that the cache holds a correct data, and that the ongoing block computation is depending on the continued correctness of this value.

PREDICT/VALID indicates that the block is predicting that, when it is ready to confirm, the value held in this cache location will continue to be equal to the value in main memory. This state indicates that the held value is now equal to main memory. This state differs from DEPENDS only in the action taken when a bus cycle modifies this memory location.

PREDICT/INVALID indicates that the block is predicting that, when it is ready to confirm, the value held in this cache location will be equal to the value in main memory. The contents of main memory currently differs from the value held in the cache.

PREDICT/ABANDON indicates that the block execution is conditional on the eventual contents of memory being side effected to be equal to that held in the cache. If it is side effected to some other value, the block will be aborted and not restarted (abandoned).

At the start of each block execution, the dependency cache is initialized. This results in setting all locations to either the INVALID or VALID states. Cache entries which are currently VALID, DEPENDS, or PREDICT/VALID are forced to the VALID state. All others are forced to the INVALID state.

Each time the processor loads a data item into a register from the depends cache, the state of the cache line is potentially modified. If the cache entry for the location is the INVALID state, a memory bus read request is performed, a new cache line allocated, the data stored in the depends cache, and the line state is set to DEPENDS. If the cache line is already VALID, then the state is simply set to DEPENDS. In all other states, the data is provided from the cache, and the state of the entry is unmodified.

A cache miss is allowed to replace any entry in the cache which is in the INVALID or VALID states, but must not modify other entries. We require this because the dependencies are being maintained by these states. This implies that the cache must be fully associative, since otherwise a conflict over the limited number of sets available for a given location would make it impossible to store the dependency information.

A Predict-Value request from the processor stores a predicted future value for a memory location into the dependency cache. The cache initiates a main memory read cycle for the same location. If the location contains the predicted value, the cache state is set to PREDICT/VALID. If the values disagree, the cache state is set to PREDICT/INVALID.

A Predict-Abandon request from the processor stores a predicted future value of a predicate into the depends cache, and forces the cache line to the PREDICT/ABANDON state.

A bus write cycle, taken by some other processor, can potentially modify a location in main memory which is held in the depends cache. Since there is a shared memory bus connecting all of the caches, each cache can monitor all of these writes. For INVALID cache entries, nothing is done. For VALID entries, the newly written data is copied into the cache, and the cache maintains validity.

For DEPEND entries, the cache is updated, and if the new contents differs from the old contents, the running block on the cache's associated processor is aborted and then restarted. This is the key mechanism for enforcing inter-block sequential consistency.

Bus writes to locations which are PREDICT/VALID or PREDICT/INVALID are compared with the contents of the depends cache. If the values agree, the cache state is set to PREDICT/VALID. If they disagree, the state is set to PREDICT/INVALID.

Bus writes to locations which are PREDICT/ABANDON are compared with the contents of the depends cache. If they agree, no change occurs. If they disagree, the associated processor is aborted, and the block currently executing is permanently abandoned.

The confirm cache preferably comprises a fully associative cache which holds only side-effected data. When the block is initialized, the confirm cache is emptied by invalidating all its entries. When the processor performs a side-effecting writ, the write data is held in the confirm cache, but not written immediately into main memory. There, it is visible to the processor which performed the side-effect, but to no other processors. The confirm cache has priority over the dependency cache in providing read data to the processor. If both hold the contents of a location, the data is provided by the confirm cache. This allows a processor to modify a location, and to have those modifications visible during further computation within the block.

When the block counter 8 reaches a block associated with a particular processor, and the block has completed execution, it is time to confirm that block. One final memory consistency check is performed. The load dependencies are necessarily satisfied, because if they were not, then the block would have been aborted. But the predicted-value dependencies may not be satisfied. These dependencies are checked by testing to see if there are any entries in the dependency cache which are in the PREDICT/INVALID state. Any entry in that state indicates a memory location whose contents was predicted to be one value, and whose actual memory contents are another. This block must be re-executed with the now-current value.

After performing this final consistency check, the side effects associated with this block may be performed. This operation consists of sweeping the confirm cache, and writing back to memory any modified entries. The write-back of these entries may, of course, force other processors to abort partially or completely executed blocks, if they have depended on the old values of these locations.

One consequence of using this cache strategy for implementing the dependency checking is that each block can perform multiple side-effects, and those side-effects will be visible only to the executing block until the block is confirmed. This enables each block to have more than just the terminal side-effect and allows the compiler flexibility in choosing the optimal block size independent of how many side-effects are present within the block.

Another important feature of using the cache as a dependency tracking mechanism is that when a transaction aborts, the valid entries in the cache remain, so that the re-execution of the block will likely achieve an almost 100% cache hit rate, reducing memory bus traffic and improving processor speed.

The Lisp operation cons, although it performs a write into main memory, is not a side effecting instruction, since it is guaranteed that there is no other pointer to the location being written, and thus no other block can be affected by its change. In the block execution architecture, this can be implemented by providing each processor with an independent free pointer. Consing and other local memory allocating writes done within a block are performed using the free pointer. The value of the pointer is saved when the block is entered, and abort rests the pointer to its entry value, automatically reclaiming the allocated storage. During the confirm, the free pointer's value is updated. All of these free pointer manipulations happen automatically if it is treated simply as another variable whose value can be loaded and side effected. Writes of data into newly consed locations need not be confirmed. They can be best handled with a write-through technique in the dependency cache. It is important that the dependency cache not contain stale copies of data which has been written with a cons write operation.

The addition of one primitive to the process instruction set allows the re-introduction of explicit programmer visible parallelism into the language supported by this architecture. The primitive performs a load operation without adding the location being loaded to the dependency list. In the depends cache, it reurns Valid data if present, and reads memory if necessary to produce valid data. It never changes the state of the cache to Depends.

With this primitive, it is possible to express algorithms which compute results based on potentially stale data. In those cases where this is acceptable from an algorithmic point of view, then parallel execution with no inter-block dependencies can be supported. One example is the Gauss-Jacobi parallel iterative matrix solution technique, as contrasted with the sequential Gauss-Seidel technique.

Figure 6:
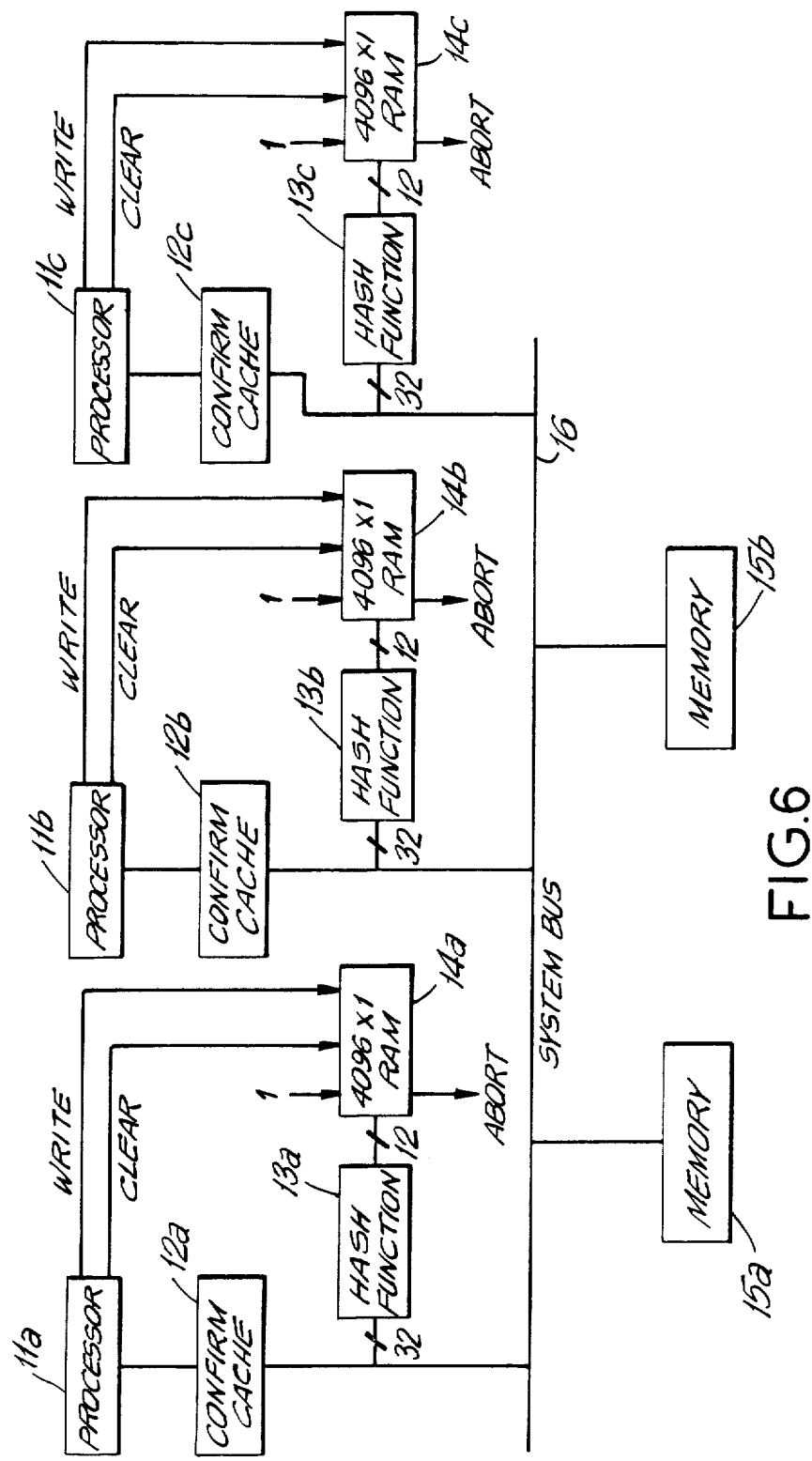
FIG. 6 is an alternate embodiment for the dependency cache shown in FIG. 1.

In an alternative hardware implementation shown in FIG. 6, dependencies are stored using a hashing technique rather than a fully associative cache. This implementation may be attractive because the RAM used is less expensive than the fully associated storage used in the cache based design.

The circuit includes processors 11a, 11b, 11c connected through the confirm cache 12a, 12b, 12c to the shared system bus 16 with memories 15a, 15b. The circuit also includes a hash function box 13a, 12b, 13c which receives the main memory address which is for example thirty-two bits and hashes it into a reproducible hashed address of for example 12 bits. The twelve bit address is used to address a 4096×1 RAM 14a, 14b, 14c. At the start of an instruction block execution in processor 11a, the Clear signal is asserted, and the RAM 14a is cleared, either by writing each location to a logic zero, or through special means for simultaneously clearing all locations. Each time processor 11a performs a memory load operation it asserts the write signal, and writes a logic one into RAM 14a at the location addressed by the hash function. Each time processor 11b terminates a block by performing its last side effect, the memory store from processor 11b to memory 15a or 15c is visible to processor 11a. Hash box 13a calculates the hashed address, and examines the bit in RAM 14a corresponding to the hashed address being written by processor 11b. It this bit is a logic one, then the block just confirmed on processor 11b has potentially (but not necessarily) invalidated by computation being performed by processor 11a. Processor 11a must abort, clear RAM 14a, and retry executing the block.

What is claimed is:

1. In a parallel processing system receptive of a program and having at least two processors connected in parallel to a shared main memory, wherein each processor executes instructions of a program which includes side effecting instructions which modify the contents of a location in main memory and functional instructions which reference locations in main memory or operate only on internal processor registers, the improvement comprising: means for compiling a program into a series of independent instruction blocks including predominantly functional instructions and terminating in a side effecting instruction; means for applying compiled blocks to the at least two processors for executing the blocks in parallel; and means for validating data to be stored in a location of main memory from each parallel processed block relative to locations referenced during execution by the other of the at least two processors, wherein the validating means comprises, for each processor, means for maintaining a dependency list of all locations in main memory which have been referenced during the execution of a block therein.

2. The system according to claim 1, wherein the validating means comprises first cache means associated with each processor for temporarily storing the location and contents of each location in main memory to be side effected by the execution of the block therein and means for confirming each block in the order of the blocks as specified in the program wherein the validity of the contents of the first cache means are approved comprising means for comparing the dependency list of the block to be confirmed with the locations side effected by already confirmed blocks to detect a match and means for aborting the execution of the block to be confirmed if there is a match.

3. The system according to claim 2, wherein the confirming means comprises a block counter and means for incrementing the block counter to indicate the next block to be confirmed.

4. The system according to claim 2, wherein the means for maintaining a dependency list comprises second cache means associated with each processor for temporarily storing each location and contents of main memory referenced by a block being executed in the processor and wherein the confirming means comprises means for updating the contents of the second cache means upon the aborting of a block and for effecting the reexecution of an aborted block with the side effected location from an already confirmed block.

5. The system according to claim 4, wherein the first and second cache means each comprises a fully associative content addressable memory.

6. The system according to claim 4, wherein the second cache means comprises an addressable random access memory for storing dependency information of main memory locations and hash table means receptive of said addresses of the main memory locations for hashing them into a reduced member of address bits for addressing the random access memory.

7. The system according to claim 1, wherein the means for maintaining a dependency list includes means for selectively referencing locations in main memory without adding same to the dependency list.

8. In a method for executing a program in at least two processors connected in parallel to a shared main memory, wherein the program includes side effecting instructions which modify the contents of a location in main memory and functional instructions which reference locations in main memory, the improvement comprising: compiling the program into a series of independent instruction blocks including predominantly functional instructions and terminating in a side effecting instruction, applying compiled blocks to the processors, executing the blocks in parallel and validating data to be stored in a location of main memory from each parallel processed block relative to locations referenced during execution by the other of the at least two processors by maintaining a dependency list for each processor of all locations in main memory which have been referenced during the execution of a block therein.

9. The method according to claim 8, wherein the step of validating further comprises for each processor temporarily storing the location and contents of each location in main memory to be side effected by the execution of the block therein and confirming each block in the order of the blocks as specified in the program to approve the validity of the stored contents by comparing the dependency list of the block to be confirmed with the locations which have been side effected by the already confirmed blocks to detect a match.

10. The method according to claim 9, wherein the step of validating further comprises aborting the execution of a block when there is a match.

11. The method according to claim 10, wherein the step of maintaining a dependency list comprises temporarily storing for each processor each location and contents of main memory referenced by the block being executed therein and wherein the step of validating further comprises reexecuting an aborted block with the side effected location from an already confirmed block.

12. The method according to claim 11, wherein the step of temporarily storing the referenced locations comprises hashing each location address into a hashed address having a reduced number of address bits and storing dependency information at the hashed address in a random access memory.

13. The method according to claim 8, where in the step of maintaining a dependency list includes selectively omitting referenced locations from the dependency list.

* * * * *